UNITED STATES PATENT OFFICE

WILLIAM SMITH AND HIRAM D. ROGERS, OF CINCINNATI, OHIO, ASSIGNORS, BY MESNE ASSIGNMENTS, TO HIRAM D. ROGERS AND LEBBEUS H. ROGERS.

IMPROVEMENT IN PRODUCING PRICES CURRENT, BULLETINS, &c.

Specification forming part of Letters Patent No. 105,380, dated July 12, 1870; antedated January 26, 1870; reissue No. 4,447, dated June 27, 1871.

*To all whom it may concern:*

Be it known that we, WILLIAM SMITH and HIRAM D. ROGERS, both of Cincinnati, Hamilton county, Ohio, have invented a new and useful Method and Appliance for Producing Statements in Manifold, of which the following is a specification:

Our invention is particularly designed to facilitate the simultaneous production of two or more copies or impressions of documents whose contents consist in part of permanent and in part of variable matter, such as market-reports, statements of stocks, price-lists of merchandise, weather-bulletins, general orders, circular-notices, letter-books, bills of lading, manifests, &c.; and it is carried into effect in the following manner:

We provide a book, tablet, or pack containing as many leaves of paper suitable for writing in manifold as may be desired, or as the required copies or impressions. This pack, book, or tablet has imprinted on each leaf columns, lines, names, headings, or other items which do not need frequent or periodical alteration, with blank lines or spaces for the corresponding or appropriate quotations or statements. In connection with the above we employ as many or half as many slips of carbonized or manifold transfer-paper as the number of desired copies. We also employ either an ordinary copying-press, or a printing-press, or a hand-stamp, or an agate or other suitable stylus, or a pen, pencil, or other suitable marking instrument.

The permanent matter is printed in any customary way, sheet by sheet, on any number of slips of paper, which, being bound or united in a book, pack, or tablet so as to register truly, the operator then interposes the proper number of transfer-sheets of blackened paper, and, either by a stamp or with the stylus or other instrument, marks down the quotations, statements, symbols, or other marks in their proper places on the upper leaf, so as to produce thereby as many fac-similes as there are leaves above or below which transfer-paper has been placed.

Another mode of operating our invention consists in taking a pack or tablet composed of blank sheets of paper, and, having interposed a sufficient number of transfer-sheets, to imprint the permanent matter simultaneously upon all the sheets thus treated by inserting the tablet in a common press, having such matter set up in type or stereotype, after which the quotations are added with a stylus.

For the multiplication of prices current and other documents of that nature our preferred mode of operation is specifically as follows: Taking a suitable book or tablet of manifold or other paper, all of whose leaves are similarly printed with permanent matter and all arranged to register, we turn over the number of leaves corresponding with the number of copies desired, and slip beneath them a piece of card-board, zinc, or tin plate. Over the lowest leaf we then place a sheet of carbonized transfer-paper, turn down one or two leaves, insert another sheet of transfer, again one or two leaves, and so on, placing the last sheet of transfer under the top leaf. The desired report or statement, being then printed or written or otherwise impressed upon the top leaf in one of the modes already described, will be found repeated below on as many leaves as have transfer-paper in contact with them.

By means of our combined printed and written duplication fac-similes of the kind spoken of can be multiplied with a speed heretofore unattained.

We are aware that it is very common to bind together printed forms, such as checks, receipts, and various other blanks, which may be more or less in register, but are not made of paper specially adapted for writing by the manifold process.

We, therefore, do not claim novelty in so connecting printed blanks with spaces for manuscript, which may accidentally be in register or approximately so, when the same are not composed of paper specially adapted or made for manifold writing; but

What we claim is—

1. A book, tablet, or pack of prepared manifold paper, having imprinted upon its leaves the columns, lines, headings, or other permanent matter, with corresponding blank spaces in register for quotations or other transient matter, substantially as described, for the purpose of producing statements, reports, notices, &c., in manifold, by the use of carbonized paper.

2. As an improved process for producing statements, reports, notices, &c., in manifold, the use of carbonized paper for producing the transient matter in connection with printed matter prepared in permanent form in relation to spaces for the variable matter, all as hereinbefore explained.

WM. SMITH.
HIRAM D. ROGERS.

Witnesses:
I. R. MARTIN,
JAMES H. LAYMAN.